(12) United States Patent
Huh et al.

(10) Patent No.: US 8,805,653 B2
(45) Date of Patent: *Aug. 12, 2014

(54) SUPERVISED NONNEGATIVE MATRIX FACTORIZATION

(75) Inventors: Seung-il Huh, Pittsburgh, PA (US); Mithun Das Gupta, Cupertino, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 708 days.

This patent is subject to a terminal disclaimer.

(21) Appl. No.: 12/854,781

(22) Filed: Aug. 11, 2010

(65) Prior Publication Data

US 2012/0041725 A1    Feb. 16, 2012

(51) Int. Cl.
*G06F 17/10* (2006.01)
*G06K 9/00* (2006.01)

(52) U.S. Cl.
CPC .............. *G06K 9/00* (2013.01); *G06K 9/00288* (2013.01)
USPC ................................ 703/2; 382/118; 382/181

(58) Field of Classification Search
None
See application file for complete search history.

(56) References Cited

U.S. PATENT DOCUMENTS

| | | | | |
|---|---|---|---|---|
| 6,584,223 | B1 * | 6/2003 | Shiiyama | 382/173 |
| 7,519,200 | B2 * | 4/2009 | Gokturk et al. | 382/118 |
| 7,576,738 | B2 * | 8/2009 | Litke et al. | 345/420 |
| 7,970,727 | B2 * | 6/2011 | Zhao et al. | 706/60 |
| 8,498,949 | B2 * | 7/2013 | Huh et al. | 706/12 |
| 8,515,879 | B2 * | 8/2013 | Huh et al. | 706/12 |
| 8,660,355 | B2 * | 2/2014 | Rodriguez et al. | 382/181 |
| 2003/0041041 | A1 | 2/2003 | Cristianini | |
| 2006/0136462 | A1 | 6/2006 | Campos et al. | |
| 2008/0212849 | A1 * | 9/2008 | Gao | 382/118 |
| 2008/0291122 | A1 | 11/2008 | Smith et al. | |
| 2009/0080666 | A1 | 3/2009 | Uhle et al. | |
| 2009/0132901 | A1 | 5/2009 | Zhu et al. | |
| 2009/0287624 | A1 | 11/2009 | Rouat et al. | |
| 2009/0324060 | A1 * | 12/2009 | Sato et al. | 382/159 |
| 2012/0041906 | A1 * | 2/2012 | Huh et al. | 706/12 |
| 2013/0266195 | A1 * | 10/2013 | Shiell et al. | 382/118 |

OTHER PUBLICATIONS

Yan, S., et al, "Graph Embedding and Extension: A general Framework Dimensionality Reduction", IEEE, Transaction on Pattern Analysis and Machine Intelligence, vol. 29, No. 1, pp. 40-51, Jan. 2007.*

D. Xu, S. Yan, D. Tao, S. Lin, and H. Zhang, "Marginal Fisher Analysis and Its Variants for Human Gait Recognition and Content-Based Image Retrieval" pp. 2811-2821, 2007 IEEE.*

J. Yang, S. Yang, Y. Fu, X. Li, T. Huang, "Non-Negative Graph Embedding", pp. 1-8, 2008 IEEE.*

Sastry, V.N., et al., "Modified Algorithm to Compute Pareto-Optimal Vectors", Journal of Optimization Theory and Applications, vol. 103, No. 1, pp. 241-244, Oct. 1999.

He, X., "Incremental Semi-Supervised Subspace Learning for Image Retrieval", Proceedings of the 12th Annual ACM International Conference on Multimedia, pp. 2-8, 2004.

(Continued)

*Primary Examiner* — Omar Fernandez Rivas
*Assistant Examiner* — Kibrom Gebresilassie

(57) ABSTRACT

Graph embedding is incorporated into nonnegative matrix factorization, NMF, while using the original formulation of graph embedding. Negative values are permitted in the definition of graph embedding without violating the nonnegative requirement of NMF. The factorized matrices of NMF are found by an iterative process.

18 Claims, 9 Drawing Sheets

(56) References Cited

OTHER PUBLICATIONS

Wang, H., et al., "Trace Ratio vs. Ratio Trace for Dimensionality Reduction", IEEE Conference on Computer Vision and Pattern Recognition, pp. 1-8, 2007.
Brunet, J.P., et al., "Metagenes and Molecular Pattern Discovery Using Matrix Factorization", National Academy of Sciences, 102(12): pp. 4164-4169, 2004.
Buciu, I., et al., "Non-negative matrix factorization in polynomial feature space", IEEE Transactions on Neural Networks, 19(6): 2008.
Cai, D., et al., "Non-negative Matrix Factorization on Manifold", ICDM, 2008.
Cooper, M., et al., "Summarizing Video using Non-Negative Similarity Matrix Factorization", IEEE Workshop on Multimedia Signal Processing, pp. 25-28, 2002.
Kim, J., et al., "Toward Faster Nonnegative Matrix Factorization: A New Algorithm and Comparisons", In ICDM, pp. 353-362, 2008.
Sha, F., et al., "Multiplicative Updates for Nonnegative Quadratic Programming in Support Vector Machines", In NIPS, 2003.
Lee, D.D., et al., "Learning the parts of objects by nonnegative matrix factorization", Nature 401: 788-791, 1999.
Lee, D.D., et al., Algorithms for Non-negative Matrix Factorization, NIPS, pp. 556-562, 2000.
Li, S. Z., et al., "Learning Spatially Localized, Parts-Based Representation", in CVPR, pp. 207-212, 2001.
Lin, C.-J., "On the Convergence of Multiplicative Update Algorithms for Non-negative Matrix Factorization", IEEE Transactions on Neural Networks, pp. 1589-1596, 2007.
Lin, C.-J., "Projected gradient methods for non-negative matrix factorization", Neural Computation, 19(10): pp. 2756-2779, 2007.
Wang, C., et al., "Multiplicative Nonnegative Graph Embedding", in CVPR, 2009.
Wang, Y., et al., "Non-Negative Matrix Factorization Framework for Face Recognition", International Journal of Pattern Recognition and Artificial Intelligence, 19(4): 495-511, 2005.
Wang, Y., et al., "Fisher Non-Negative Matrix Factorization for Learning Local Features", in ACCV, 2004.
Xu, Dong, et al., "Marginal Fisher Analysis and its Variants for Human Gait Recognition and Content-Based Image Retrieval", IEEE Trans. on Image Processing, 16(11), 2007.
Xu, W., et al., "Document Clustering Based on Non-negative Matrix Factorization", SIGIR, ACM Conference, pp. 267-273, 2003.
Yang, J., et al., "Non-Negative Graph Embedding", in CVPR 2008.
Zafeiriou, S., et al., "Nonlinear Nonnegative Component Analysis", CVPR, pp. 2860-2865, 2009.
Duda, R., et al., "Pattern Classification, Second Edition, pp. 215-281, Linear Discriminant Functions", 2006.

\* cited by examiner

| Algorithm | JAFFE Database |
|---|---|
| KPCA | 71.4 / 81 |
| PCA | 74.6 / 36 |
| ICA | 74.6 / 36 |
| NMF | 74.6 / 49 |
| LNMF | 74.6 / 36 |
| KICA | 76.2 / 81 |
| LDA | 77.8 / 6 |
| PNMF | 77.8 / 49 |
| SNMF | 81 / 36 |

TABLE 1

SUPERVISED NONNEGATIVE MATRIX FACTORIZATION

CROSS-REFERENCE TO RELATED APPLICATIONS

This application is related to U.S. patent application Ser. No. 12/854,768 entitled "Supervised Nonnegative Matrix Factorization" filed on the same day as the instant application, and U.S. patent application Ser. No. 12/854,776 entitled "Supervised Nonnegative Matrix Factorization" filed on the same day as the instant application. These related applications are hereby incorporated by reference for all purposes.

BACKGROUND

1. Field of Invention

The present invention relates to the field of matrix factorization. More specifically, it relates to the field of matrix factorization with incorporated data classification properties.

2. Description of Related Art

Matrix factorization is a mechanism by which a large matrix U (where $U \in \mathbb{R}^{d \times n}$) is factorized into the product of two, preferably smaller matrices: a basis matrix V (where $V \in \mathbb{R}^{d \times r}$) and a coefficient matrix X (where $X \in \mathbb{R}^{r \times n}$). A motivation for this is that is often easier to store and manipulate smaller matrices V and X, than it is to work with a single, large matrix U. However, since not all matrices can be factorized perfectly, if at all, matrices V and X are often approximations. An objective of matrix factorization is therefore to identify matrices V and X such that when they are multiplied together, the result closely match matrix U with minimal error.

Among the different approaches to matrix factorization, an approach that has gained favor in the community is nonnegative matrix factorization (NMF) due to its ease of implementation and useful applications Nonnegative matrix factorization has recently been used for various applications, such as face recognition, multimedia, text mining, and gene expression discovery. NMF is a part-based representation wherein nonnegative inputs are represented by additive combinations of nonnegative bases. The inherent nonnegativity constraint in NMF leads to improved physical interpretation compared to other factorization methods, such as Principal Component Analysis (PCA).

Although NMF, and its variants, are well suited for recognition applications, they lack classification capability. The lack of classification capability is a natural consequence of its unsupervised factorization method, which does not utilize relationships within input entities, such as class labels.

Several approaches have been proposed for NMF to generate more descriptive features for classification and clustering tasks. For example, "Fisher Nonnegative Matrix Factorization", ACCV, 2004, by Y. Wang, Y. Jiar, C. Hu, and M. Turk, proposes incorporating the NMF cost function and the difference of the between-class scatter from the within-class scatter. However, the objective of this Fisher-NMF is not guaranteed to converge since it may not be a convex function. "Non-negative Matrix Factorization on Manifold", ICDM, 2008, by D. Cai, X. He, X. Wu, and J. Han proposes graph regularized NMF (GNMF), which appends terms representing favorable relationships among feature vector pairs. But, GNMF is handicapped by not considering unfavorable relationships.

A different approach better suited for classification is a technique called "graph embedding", which is derived from topological graph theory. Graph embedding, embeds a graph G on a surface, and is a representation of graph G on the surface in which points of the surface are associated with vertices.

Recently, J. Yang, S. Yang, Y. Fu, X. Li, and T. Huang suggested combining a variation of graph embedding with nonnegative matrix factorization in an approached termed "Non-negative graph embedding" (NGE), in CVPR, 2008. NGE resolved the previous problems by introducing the concept of complementary space so as to be widely considered the state-of-the-art. NGE, however, does not use true graph embedding, and instead utilizes an approximate formulation of graph embedding. As a result, NGE is not effective enough for classification, particularly when intra-class variations are large.

In a general sense, all of these previous works tried to incorporate NMF with graph embedding, but none of them successfully adopted the original formulation of graph embedding because the incorporated optimization problem is considered intractable. In addition, all the works are limited in that they depend on suitable parameters which are not easy to determine appropriately.

It is an object of the present invention to incorporate NMF with graph embedding using the original formulation of graph embedding.

It is another object of the present invention to permit the use of negative values in the definition of graph embedding without violating the requirement of NMF to limit itself to non-negative values.

SUMMARY OF INVENTION

The above objects are met in method of factorizing a data matrix U file by supervised nonnegative factorization, SNMF, including: providing a data processing device to implement the following step: accessing the data matrix U from a data store, wherein data matrix U is defined as $U \in \mathbb{R}^{d \times n}$; defining an intrinsic graph G, wherein G={U,W}, each column of $U \in \mathbb{R}^{d \times n}$ representing a vertex, and each element of similarity matrix W measures the similarity between vertex pairs; defining a penalty graph $\overline{G}$, wherein $\overline{G}=\{U, \overline{W}\}$ and each element of dissimilarity matrix $\overline{W}$ measures unfavorable relationships between the vertex pairs; defining an intrinsic diagonal matrix r), wherein $D=[D_{ij}]$ and $D_{ii}=\Sigma_{j=1}^n W_{ij}$; defining an intrinsic Laplacian matrix L, wherein L=D−W; defining a penalty diagonal matrix $\overline{D}$, wherein $\overline{D}=[\overline{D}_{ij}]$ and $\overline{D}_{ii}=\Sigma_{j=1}^n \overline{W}_{ij}$; defining a penalty Laplacian matrix $\overline{L}$, wherein $\overline{L}=\overline{D}-\overline{W}$; defining a basis matrix V, where $V \in \mathbb{R}^{r \times n}$; defining a feature matrix X, where $X \in \mathbb{R}^{d \times r}$ defining a measure of the compactness of intrinsic graph G by the weighted sum of squared distances defined as $\Sigma_{i<j}^n W_{ij}\|x_i-x_j\|^2=Tr(XLX^T)$, wherein $x_i$ is the i-th column of X and $x_j$ is the j-th column of X; defining a measure of the separability of penalty graph $\overline{G}$ by the weighted sum of squared distances defined as $\Sigma_{i<j}^n \overline{W}_{ij}\|x_i-x_j\|^2=Tr(X\overline{L}X^T)$, wherein $x_i$ is the i-th column of X and $x_j$ is the j-th column of X; defining $F^{(1)}(V,X)$ as an objective of NMF (nonnegative matrix factorization); defining $F^{(2)}(X)$ as an objective of graph embedding, $F^{(2)}(X)$ being proportional to ratio $$\frac{Tr(XLX^T)}{Tr(X\overline{L}X^T)};$$

deriving an SNMF objective from a sum of $F^{(1)}(V,X)$ and $F^{(2)}(X)$, and determining the SNMF objective through iterative multiplicative updates.

Preferably, $F^{(1)}(V,X)$ is defined as $F^{(1)}(V,X)=\frac{1}{2}\|U-VX\|_F^2$; and $F^{(2)}(X)$ is defined as $$F^{(2)}(X) = \frac{\lambda}{2} \frac{Tr(XLX^T)}{Tr(X\overline{L}X^T)},$$

where $\lambda$ is a multiplication factor determined by a validation technique.

Further preferably, $F^{(1)}(V,X)$ is defined as $F^{(1)}(V,X)=\frac{1}{2}\|U-VX\|_F^2$; $F^{(2)}(X)$ is defined as $$F^{(2)}(X) = \frac{\lambda}{2} \frac{Tr(QXLX^T)}{Tr(QX\overline{L}X^T)},$$

where $\lambda$ is a multiplication factor determined by a validation technique, and where $$Q = \mathrm{diag}\left(\left[\|v_1\|^2, \|v_2\|^2, \ldots, \|v_R\|^2\right]^T\right);$$

and the SNMF objective is defined as $$\min_{V,X} F(V, X) = \frac{1}{2}\|U - VX\|_F^2 + \frac{\lambda}{2}\frac{Tr(QXLX^T)}{Tr(QX\overline{L}X^T)}.$$

Following this definition of $F^{(1)}(V,X)$ and $F^{(2)}(X)$, the SNMF objective is approximated as $$\tilde{F}(V, X) = \frac{1}{2}\|U - VX\|_F^2 + \frac{\lambda}{2}\left(\alpha Tr(QXLX^T) - \beta Tr(QX\overline{L}X^T) + \frac{\beta}{\alpha}\right),$$

where $V=V^t$ and $X=X^t$ at time t and $$\alpha = \frac{1}{Tr(Q^t X^t \overline{L} X^{tT})} \text{ and } \beta = \frac{Tr(Q^t X^t L X^{tT})}{\left(Tr(Q^t X^t \overline{L} X^{tT})\right)^2}.$$

Following this approach, the SNMF objective is determined through the following iterative multiplicative updates:

$$X_{ij} \leftarrow X_{ij} \frac{(V^T U + \lambda QX(T_{\overline{D}} + T_{\overline{W}}))_{ij}}{(V^T VX + \lambda QX(T_D^+ + T_W^+))_{ij}}$$

where $T_D = \alpha D - \beta \overline{D}$ and $T_W = \alpha W - \beta \overline{W}$, and $$V_{ij} \leftarrow V_{ij} \frac{(UX^T + \lambda VS^-)_{ij}}{(VXX^T + \lambda VS^+)_{ij}} \text{ where } S = \alpha L - \beta \overline{L}.$$

In a preferred embodiment, matrix U is comprised of n samples and each column of U represents a sample. Further preferably, each of the samples is an image file.

W and $\overline{W}$ may be generated from true relationships among data pairs. These data pairs may be class label data.

In a preferred embodiment, each column of feature matrix X is a low dimensional representation of the corresponding column of U.

Also preferably, at least one of similarity matrix W or dissimilarity matrix $\overline{W}$ has negative values. But $Tr(XLX^T)$ and $Tr(X\overline{L}X^T)$ are preferably positive.

In an embodiment of the present invention, similarity matrix W and dissimilarity matrix $\overline{W}$ are defined by the concept of within-class and between-class distances of Linear Discriminant Analysis (LDA). In this embodiment, similarity matrix $W=[W_{ij}]$ is defined as:

$$W_{ij} = \begin{cases} \frac{1}{n_c} & \text{if } y_i, y_j \in c \\ 0 & \text{otherwise} \end{cases}$$

wherein $y_i$ is a class label of the i-th sample, $y_j$ is a class label of the j-th sample, and $n_c$ is the size of class c; and dissimilarity matrix $\overline{W}=[\overline{W}_{ij}]$ is defined as $$\overline{W}_{ij} = \frac{1}{n} - W_{ij}$$

wherein n is the number of data points.

The present invention is also embodied in a data classification system for classifying test data, having: a data processing device with access to a data matrix U of training data and with access to the test data, the data matrix U being defined as $U \in \mathbb{R}^{d \times n}$; wherein the data processing device classifies the test data according to a classification defined by $X_{ij}$; wherein an intrinsic graph G is defined as $G=\{U,W\}$, each column of $U \in \mathbb{R}^{d \times n}$ representing a vertex and each element of similarity matrix W measuring the similarity between vertex pairs; a penalty graph $\overline{G}$ is defined as $\overline{G}=\{U, \overline{W}\}$ and each element of dissimilarity matrix $\overline{W}$ measures unfavorable relationships between the vertex pairs; an intrinsic diagonal matrix D is defined as $D=[D_{ij}]$ and $D_{ii}=\sum_{j=1}^n W_{ij}$; an intrinsic Laplacian matrix L is defined as $L=D-W$; a penalty diagonal matrix $\overline{D}$ is defined as $\overline{D}=[\overline{D}_{ij}]$ and $\overline{D}_{ii}=\sum_{j=1}^n \overline{W}_{ij}$; a penalty Laplacian matrix $\overline{L}$ is defined as $\overline{L}=\overline{D}-\overline{W}$; a basis matrix V is defined as $V \in \mathbb{R}^{d \times r}$ a feature matrix X is defined as $X \in \mathbb{R}^{r \times n}$; a measure of the compactness of intrinsic graph G is defined by the weighted sum of squared distances defined as $\sum_{i<j}^n W_{ij}\|x_i-x_j\|^2 = Tr(XLX^T)$, wherein $x_i$ is the i-th column of X and $x_j$ is j-th column of X; a measure of the separability of penalty graph $\overline{G}$ is defined by the weighted sum of squared distances defined as $\sum_{i<j}^n \overline{W}_{ij}\|x_i-x_j\|^2 = Tr(X\overline{L}X^T)$, wherein $x_i$ is the i-th column of X and $x_j$ is the j-th column of X; $F^{(1)}(V,X)$ defines an objective of NMF (nonnegative matrix factorization), wherein as $F^{(1)}(V,X)=\frac{1}{2}\|U-VX\|_F^2$; $F^{(2)}(X)$ defines an objective of graph embedding, where $$F^{(2)}(X) = \frac{\lambda}{2} \frac{Tr(QXLX^T)}{Tr(QX\overline{L}X^T)},$$

$\lambda$ is a multiplication factor determined by a validation technique, and $$Q = \text{diag}\left(\left[\|v_1\|^2, \|v_2\|^2, \ldots, \|v_R\|^2\right]^T\right);$$

and an approximation of supervised nonnegative factorization, SNMF, is defined as $$\tilde{F}(V, X) = \frac{1}{2}\|U - VX\|_F^2 + \frac{\lambda}{2}\left(\alpha Tr(QXLX^T) - \beta Tr(QX\bar{L}X^T) + \frac{\beta}{\alpha}\right),$$

where $V = V^t$ and $X = X^t$ at time t, $$\alpha = \frac{1}{Tr(Q^t X^t \bar{L} X^{tT})}, \text{ and } \beta = \frac{Tr(Q^t X^t L X^{tT})}{\left(Tr(Q^t X^t \bar{L} X^{tT})\right)^2};$$

factorized matrices $X_{ij}$ and $V_{ij}$ are identified by the following iterative multiplicative updates:

$$X_{ij} \leftarrow X_{ij} \frac{(V^T U + \lambda QX(T_{\bar{D}}^- + T_{\bar{W}}))_{ij}}{(V^T VX + \lambda QX(T_{\bar{D}}^+ + T_{\bar{W}}))_{ij}}$$

where $T_{\bar{D}} = \alpha D - \beta \bar{D}$ and $T_{\bar{W}} = \alpha W - \beta \bar{W}$, and $$V_{ij} \leftarrow V_{ij} \frac{(UX^T + \lambda V S^-)_{ij}}{(VXX^T + \lambda V S^+)_{ij}} \text{ where } S = \alpha L - \beta \bar{L}.$$

Preferably, data matrix U is comprised of n samples and each column of U represents a sample. In this case, each of the samples may be an image file.

Further preferably, the data pairs are class labels of data. Additionally, each column of feature matrix X may be a low dimensional representation of the corresponding column of U.

In an embodiment of the present invention, at least one of similarity matrix W or dissimilarity matrix $\bar{W}$ has negative values.

Additionally, similarity matrix $W = [W_{ij}]$ is preferably defined as:

$$W_{ij} = \begin{cases} \frac{1}{n_c} & \text{if } y_i, y_j \in c \\ 0 & \text{otherwise} \end{cases}$$

wherein $y_i$ is a class label of the i-th sample and $n_c$ is the size of class c; and dissimilarity matrix $\bar{W} = [\bar{W}_{ij}]$ is defined as $$\bar{W}_{ij} = \frac{1}{n} - W_{ij}$$

wherein n is the total number of data points.

The above objects are also met in a method of factorizing a data matrix U file by supervised nonnegative factorization, SNMF, having: providing a data processing device to implement the following step: accessing the data matrix U from a data store, wherein data matrix U is defined as $U \in \mathbb{R}^{d \times n}$ defining an intrinsic graph G, wherein $G = \{U, W\}$, each column of $U \in \mathbb{R}^{d \times n}$ represents a vertex, and each element of similarity matrix W measures the similarity between vertex pairs; defining a penalty graph $\bar{G}$, wherein $\bar{G} = \{U, \bar{W}\}$ and each element of dissimilarity matrix $\bar{W}$ measures unfavorable relationships between the vertex pairs; defining an intrinsic diagonal matrix D, wherein $D = [D_{ij}]$ and $D_{ii} = \Sigma_{j=1}^n W_{ij}$; defining an intrinsic Laplacian matrix L, wherein $L = D - W$; defining a penalty diagonal matrix $\bar{D}$, wherein $\bar{D} = [\bar{D}_{ij}]$ and $\bar{D}_{ii} = \Sigma_{j=1}^n \bar{W}_{ij}$; defining a penalty Laplacian matrix $\bar{L}$, wherein $\bar{L} = \bar{D} - \bar{W}$; defining a basis matrix V, where $V \in \mathbb{R}^{d \times r}$; defining a feature matrix X, where $X \in \mathbb{R}^{r \times n}$; given a kernel NMF optimization problem of $\min \frac{1}{2}\|U^\Phi - V^\Phi X\|_F^2$ wherein $v^\Phi_{ij} \geq 0$ and $x_{ij} \geq 0$ for $\forall$ i, j, $U^\Phi = [\phi(u_1), \phi(u_2), \ldots, \phi(u_N)]$, $V^\Phi = [\phi(v_1), \phi(v_2), \ldots, \phi(v_R)]$ and $\phi: \mathbb{R}^M_+ \to \mathcal{H}_+$ is a mapping that projects an image u to a Hilbert space $\mathcal{H}$, redefining the kernel NMF optimization as $\frac{1}{2}\|\Phi - U^\Phi HX\|_F^2$; defining favorable relationships among feature vector pairs as:

$$F_{DIS}(X) = \sum_{i<j}^N W_{ij} \sum_{k=1}^R (x_{ik} - x_{jk})^2 \|(U^\phi H)_k\|^2 = Tr(Q^\phi X L X^T),$$

where $$Q^\phi = \text{diag}\left(\left[(H^T K H)_{11}, (H^T K H)_{22}, \ldots, (H^T K H)_{RR}\right]^T\right);$$

defining unfavorable relationships between features vector pairs as:

$$\bar{F}_{DIS}(X) = \sum_{i<j}^N \bar{W}_{ij} \sum_{k=1}^R (x_{ik} - x_{jk})^2 \|(U^\phi H)_k\|^2 = Tr(Q^\phi X \bar{L} X^T);$$

defining an SNMF objective function as $$F(H, X) = \frac{1}{2}\|U^\phi - U^\phi HX\|_F^2 + \frac{\lambda}{2} \frac{Tr(Q^\phi X L X^T)}{Tr(Q^\phi X \bar{L} X^T)};$$

and applying the following iteratively multiplicative updates to achieve the SNMF objective function:

$$X_{ij} \leftarrow X_{ij} \frac{(H^T K + \lambda QX(T_{\bar{D}}^- + T_{\bar{W}}))_{ij}}{(H^T KHX + \lambda QX(T_{\bar{D}}^+ + T_{\bar{W}}))_{ij}}$$

and $$H_{ij} \leftarrow H_{ij} \frac{(KX^T + \lambda KHS^-)_{ij}}{(KHXX^T + \lambda KHS^+)_{ij}}.$$

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Recently, Nonnegative Matrix Factorization (NMF) has received much attention due to its representative power for nonnegative data. The discriminative power of NMF, however, is limited by its inability to consider relationships present in data, such as class labels. Several works tried to address this issue by adopting the concept of graph embedding, albeit in an approximated form. Herein, a Supervised NMF (SNMF) approach that incorporates the objective function of graph embedding with that of nonnegative matrix factorization is proposed.

Before describing SNMF, it is beneficial to first provide background information regarding non-negative matrix factorization (NMF) and graph embedding.

Figure 1:
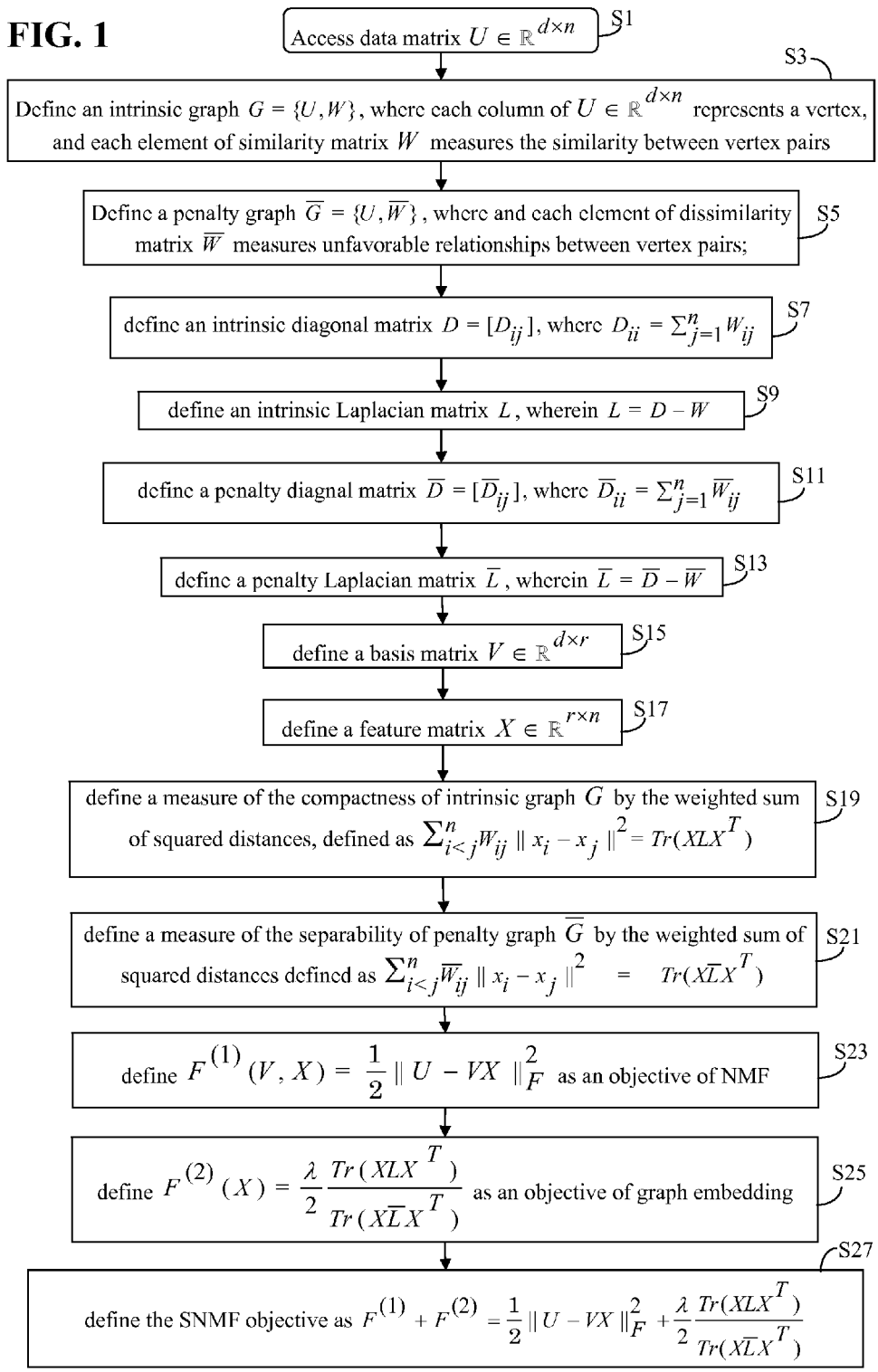
FIG. 1 is a flowchart of a preferred SNMF method in accord with the present invention.

With reference to FIG. 1, SNMF combines the benefits of non-negative matrix factorization (NMF) and graph embedding, each of which is discussed in turn.

Given a raw matrix $U=[u_1, u_2, \ldots, u_n] \in \mathbb{R}_+^{d \times n}$, SNMF, like NMF, factorizes a matrix U into the product of two, preferably smaller matrices: a basis matrix V (where $V=[v_1, v_2, \ldots, v_r] \in \mathbb{R}_+^{d \times r}$) and a coefficient matrix (or feature matrix) X (where $X=[x_1, x_2, \ldots, x_n] \in \mathbb{R}^{r \times n}$). For example, matrix U may be a raw data matrix of n samples (or data points) with each sample being of dimension d such that $U \in \mathbb{R}^{d \times n}$ (step S1). A specific example of this may be if each of the n columns of U (i.e. each of the n samples) is an image of size d. Matrix U is factorized into the product of basis matrix V and a feature matrix X by minimizing the following reconstruction error:

$$\min_{V,X} \frac{1}{2} \|U - VX\|_F^2 \quad \text{s.t.} \quad V_{ik} \geq 0 \text{ and } X_{kj} \geq 0 \; \forall \, i, j, \text{ and } k \quad (1)$$

Where $\|\cdot\|_F$ denotes the Frobenius norm. Since Eq. (1) is not a convex function of both V and X, there is no closed form solution for the global optimum. Thus, many researchers have developed iterative update methods to solve the problem. Among them, a popular approach is the multiplicative updates devised by Lee and Seung in "Learning the parts of objects by non-negative matrix factorization", Nature, 401: 788-791, 1999, which is hereby incorporated in its entirety by reference. These multiplicative updates, shown below as equation (2), are popular due to their simplicity.

$$V_{ij} \leftarrow V_{ij} \frac{(UX^T)_{ij}}{(VXX^T)_{ij}}, \; X_{ij} \leftarrow X_{ij} \odot \frac{(V^T U)_{ij}}{(V^T VX)_{ij}} \quad (2)$$

These updates monotonically decrease the objective function in Eq. (1).

Graph embedding, on the other hand, may be defined as the optimal low dimensional representation that best characterizes the similarity relationships between data pairs. In graph embedding, dimensionality reduction involves two graphs: an intrinsic graph that characterizes the favorable relationships among feature vector pairs and a penalty graph that characterizes the unfavorable relationships among feature vector pairs. Thus, applying graph embedding to data matrix U would organize its raw data into classes according to specified favorable and unfavorable relationships. To achieve this, however, one first needs to define graph embedding as applied to data matrix U.

For graph embedding, one let G={U,W} be an intrinsic graph where each column of $U \in \mathbb{R}^{d \times n}$ represents a vertex and each element of W (where $W \in \mathbb{R}^{n \times n}$) measures the similarity between vertex pairs (step S3). In the same way, a penalty graph $\overline{G}$, which measures the unfavorable relationships between vertex pairs may be defined as $\overline{G}=\{U,\overline{W}\}$, where $\overline{W} \in \mathbb{R}^{n \times n}$ (step S5). In this case, W and $\overline{W}$ can be generated from true relationships among data pairs, such as class labels of data.

In addition, the diagonal matrix $D=[D_{ij}]$ is defined, where $D_{ii}=\sum_{j=1}^n W_{ij}$ (step S7) and the Laplacian matrix $L=D-W$ is defined (step S9). Matrices $\overline{D}$ and $\overline{L}$ are defined from $\overline{W}$ in the same way (steps S11 and S13), such that $\overline{D}_{ii}=\sum_{j=1}^n \overline{W}_{ij}$ and $\overline{L}=\overline{D}-\overline{W}$.

As is explained above, to factorize data matrix U, which is defined as $U \in \mathbb{R}^{d \times n}$, one defines a basis matrix V such that $V \in \mathbb{R}^{d \times r}$ (step S15), defines a feature matrix X such that $X \in \mathbb{R}^{r \times n}$ (step S17), and seeks to populate V and X such that the product of V and X approximates U with minimal error. An object of the present invention, however, is to combine graph embedding with the factorization of matrix U such that the classification properties of graph embedding are incorporated into factorized basis matrix V and a feature matrix X. The present embodiment achieves this by defining the objective of graph embedding in terms of feature matrix X.

First, let each column of feature matrix X be a low dimensional representation of the corresponding column of U. Then, one can measure the compactness of the intrinsic graph G and the separability of the penalty graph $\overline{G}$ by the weighted sum of squared distances of feature matrix X, as follows:

$$F_{DIS}(X) = \Sigma_{i<j}{}^n W_{ij} \|x_i - x_j\|^2 = Tr(XLX^T) \quad \text{(Step S19)}$$

$$\overline{F}_{DIS}(X) = \Sigma_{i<j}{}^n \overline{W}_{ij} \|x_i - x_j\|^2 = Tr(X\overline{L}X^T) \quad \text{(Step S19)}$$

where $F_{DIS}$ expresses the compactness of favorable relationships, $\overline{F}_{DIS}$ expresses the separability of unfavorable relationships, $x_i$ is the i-th column of X, and $x_j$ is j-th column of X.

It is desired to minimized $F_{DIS}$ and maximize $\overline{F}_{DIS}$ for a given W and $\overline{W}$. The objective of graph embedding, as is the case of most dimensionality reduction methods, can therefore be generalized to the following unified framework with specifically defined W and $\overline{W}$.

$$\min \frac{Tr(XLX^T)}{Tr(X\overline{L}X^T)} \quad (5)$$

To acquire both the benefits of part-based representation and the classification power of graph embedding, the present approach addresses both the objectives of NMF and the objective of graph embedding. However, unlike previous works, the present invention utilizes the ratio formation of graph embedding. The objective of NMF, $F^{(1)}(V,X)$, can be derived from equation (1), or can be re-expressed as equation (7) (step S23), where the constant multiple of ½ may be optionally dropped for simplicity. That is, it simplifies the derivative.

$$\left. \begin{aligned} F^{(1)}(V, X) &= \|U - VX\|_F^2 \\ \text{or alternatively} \\ F^{(1)}(V, X) &= \frac{1}{2}\|U - VX\|_F^2 \end{aligned} \right\} \quad (7)$$

The objective of graph embedding, $F^{(2)}(X)$, can be derived from equation (5) or re-expressed as equation (8) (step S25), as:

$$\left. \begin{aligned} F^{(2)}(X) &= \frac{Tr(XLX^T)}{Tr(X\overline{L}X^T)} \\ \text{or alternatively} \\ F^{(2)}(X) &= \frac{\lambda}{2} \frac{Tr(XLX^T)}{Tr(X\overline{L}X^T)} \end{aligned} \right\} \quad (8)$$

where parameter $\lambda$ is a multiplication factor determined using a validation technique, i.e. determined by running experiments with different values of $\lambda$'s and selecting the best one.

Thus the objective of SNMF may be defined by the combined objectives formulation of NMF and graph embedding (step S27) as:

$$\min_{V,X} \|U - VX\|_F^2 + \frac{Tr(XLX^T)}{Tr(X\overline{L}X^T)} \quad (9)$$

or alternatively, $$\min_{V,X} \frac{1}{2}\|U - VX\|_F^2 + \frac{\lambda}{2} \frac{Tr(XLX^T)}{Tr(X\overline{L}X^T)} \quad (10)$$

This approach explicitly minimizes the ratio of two distances, which is relative compactness of the favorite relationship. Consequently, SNMF can employ any definitions of similarity and dissimilarity matrices W and $\overline{W}$ (including negative values) if both $Tr(XLX^T)$ and $Tr(X\overline{L}X^T)$ are positive. These constraints are reasonable since $Tr(XLX^T)$ and $Tr(X\overline{L}X^T)$ are distance measures. By contrast, NGE of the prior art requires more restricted constraints when defining the matrices. For example, in NGE, all the elements of W and $\overline{W}$ must be nonnegative because negative elements can make the objective of NGE be a non-convex function.

Also unlike, NGE, SNMF does not require any complementary spaces. NGE requires the introduction of complementary spaces to construct objective functions by addition of nonnegative terms. However, it is doubtful whether the complementary space exists without violating the nonnegative constrains. Even if such spaces exist, one has no guarantee that the objective function of NGE can discover the complementary space.

Before describing a detailed implementation for achieving the objectives of SNMF, as described in equations (9) and (10), a sample definition of W and $\overline{W}$ is provided. A presently preferred embodiment defines W and $\overline{W}$ by borrowing the concept of within-class and between-class distances from Linear Discriminant Analysis (LDA), as is generally described, for example, in chapter 5 of book "*Pattern Classification*" by R. O. Duda, P. E. Hart, and D. G. Stork, published by Wiley-interscience, Hoboken, N.J., 2nd edition, 2001, which is hereby incorporated by reference. This approach begins by letting $y_i$ be a class label of the i-th sample and $n_c$ be the size of class c. Alternatively, $y=[y_1, y_2, \ldots y_n]^T$, where $y_i \in \{1, 2, \ldots, C\}$, is a true label vector. Matrices $W=[W_{ij}]$ and $\overline{W}=[\overline{W}_{ij}]$ may be defined as $$W_{ij} = \begin{cases} \frac{1}{n_c} & \text{if } y_i, y_j \in c \\ 0 & \text{otherwise} \end{cases}$$

and $$\overline{W}_{ij} = \frac{1}{n} - W_{ij}$$

where n is the total number of data points Alternatively, matrices $W=[W_{ij}]$ and $\overline{W}=[\overline{W}_{ij}]$ may also be defined as $$W_{ij} = \begin{cases} \frac{1}{n_c} & \text{if } y_i = y_j \\ 0 & \text{otherwise} \end{cases}$$

and $$\overline{W}_{ij} = 1 - W_{ij}$$

Note that the elements of $\overline{W}$ can be negative, which means that NGE cannot use W and $\overline{W}$ from the LDA formulation, as describe immediately above. Not only can SNMF adopt the LDA formulation in order to measure similarities, but other formulations can be adopted as well. For example, for multimodal data sets, the Marginal Fisher Analysis (MFA) formulation, which effectively reflects local relationships among data, can be used. Information on MFA is provided in "Marginal Fisher Analysis and Its Variants For Human Gait Recognition and Content-based Image Retrieval", IEEE Trans on Image Processing, 16(11), 2007, by D. Xu, S. Yan, D. Tao, S. Lin, and H. J. Zhang, which is herein incorporated in its entirety.

Preferably, all the pair-wise distances are computed based on the unit basis vectors. This normalized distance calculation prevents the distance ratio from meaninglessly decreasing due to rescaling of basis vectors.

Figure 2:
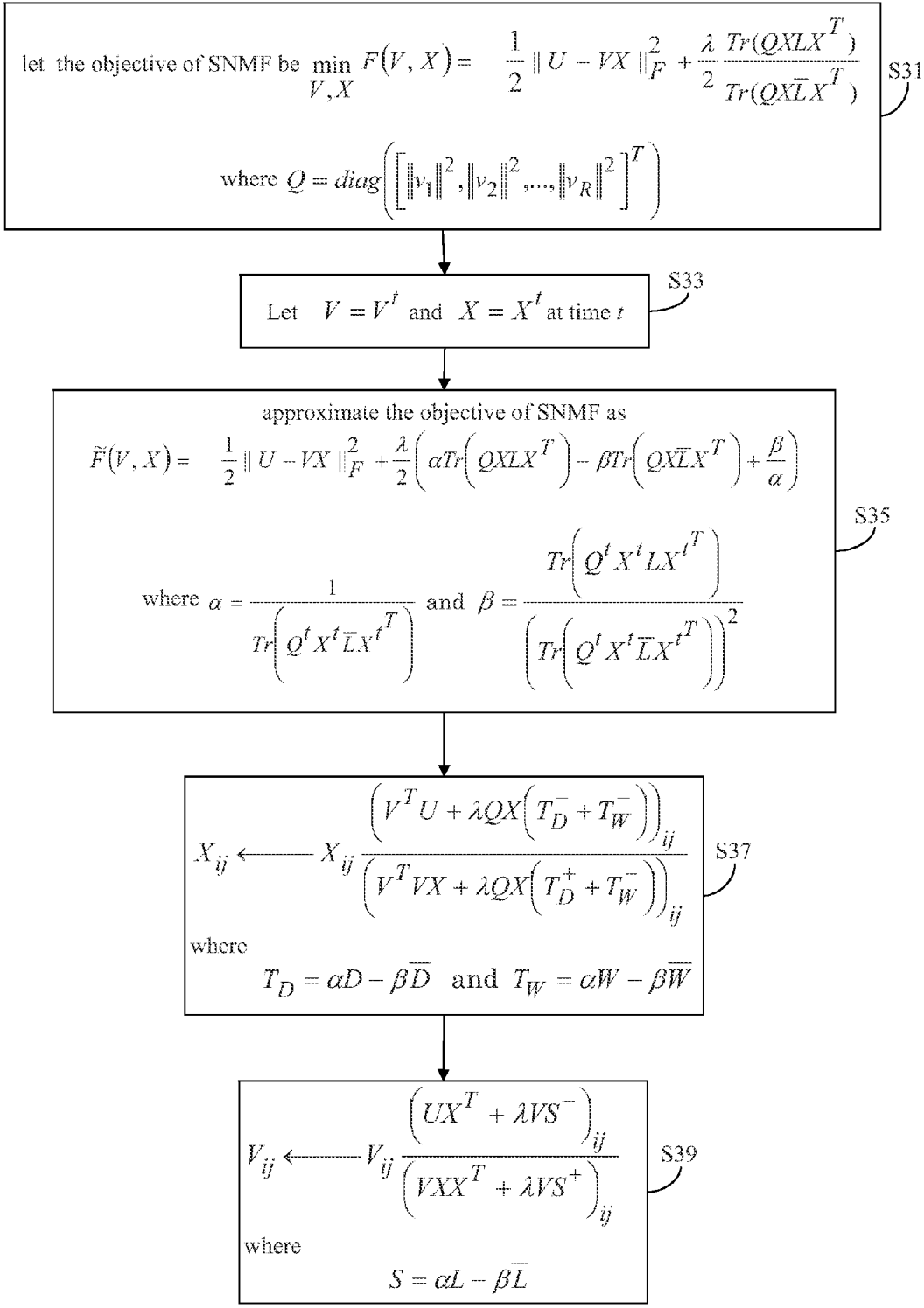
FIG. 2 is a flow chart of preferred updates for the preferred SNMF objective.

With reference to FIG. 2, in the following example, the following SNMF objective function (step S28), as defined from equation (10), is optimized.

$$\min_{V,X} F(V, X) = \frac{1}{2}\|U - VX\|_F^2 + \frac{\lambda}{2} \frac{Tr(QXLX^T)}{Tr(QX\overline{L}X^T)} \quad (11)$$

where $$Q = \text{diag}([\|v_1\|^2, \|v_2\|^2, \ldots, \|v_R\|^2]^T).$$

F(V,X) is not a convex function of both V and X. Therefore, interactive updates are needed to minimize the objective function (11). Due to its fractional term, F(V,X) can be troublesome to optimize by multiplicative updates. Therefore, a presently preferred embodiment uses an approximation of its fractional term with a subtraction of two terms at each time t. Suppose that $V=V^t$ and $X=X^t$ at time t (step S33). The approximate function of F(V,X) may be defined as (step S35):

$$\tilde{F}(V, X) = \frac{1}{2}\|U - VX\|_F^2 + \frac{\lambda}{2}\left(\alpha Tr(QXLX^T) - \beta Tr(QX\overline{L}X^T) + \frac{\beta}{\alpha}\right) \quad (12)$$

where $$\alpha = \frac{1}{Tr(Q^tX^t\overline{L}X^{tT})} \text{ and } \beta = \frac{Tr(Q^tX^tLX^{tT})}{(Tr(Q^tX^t\overline{L}X^{tT}))^2} \quad (13)$$

If $F(V^t, X^t) \cong \tilde{F}(V^t, X^t)$ and $\frac{\partial}{\partial X}F(V^t, X)\Big|_{X=X^t} \cong \frac{\partial}{\partial X}\tilde{F}(V^t, X)\Big|_{X=X^t}$ then $\tilde{F}(V^t,X)$ is non-increasing under the following multiplicative update rules (step S37).

$$X_{ij} \leftarrow X_{ij} \frac{(V^TU + \lambda QX(T_D^- + T_{\overline{W}}))_{ij}}{(V^TVX + \lambda QX(T_D^+ + T_{\overline{W}}))_{ij}} \quad (14)$$

where $$T_D = \alpha D - \beta\overline{D} \text{ and } T_W = \alpha W - \beta\overline{W} \quad (15)$$

In addition, for a matrix A, $A^+=[A_{ij}^+]$ and $A^-=[A_{ij}^-]$, where $$A_{ij}^+ = \begin{cases} A_{ij} & \text{if } A_{ij} > 0 \\ 0 & \text{otherwise} \end{cases} \quad (16)$$

and

-continued $$A_{ij}^- = \begin{cases} -A_{ij} & \text{if } A_{ij} < 0 \\ 0 & \text{otherwise} \end{cases} \quad (17)$$

Therefore, $\tilde{F}(V^t,X)$ is non-increasing under the following multiplicative update (step S39):

$$V_{ij} \leftarrow V_{ij} \frac{(UX^T + \lambda VS^-)_{ij}}{(VXX^T + \lambda VS^+)_{ij}} \quad (18)$$

where $$S = \alpha L - \beta\overline{L} \quad (19)$$

This leads to the following theorem:

Theorem 1: The approximation of objective function $\tilde{F}$ in equation (12) is non-increasing under the update rules of equations (14) and (18). A proof of Theorem 1 is provided the appendix, attached below.

Since the multiplicative factors of equations (14) and (18) are always non-negative by Theorem 1, it follows that all elements in V and X are maintained non-negative after each update.

Figure 3:
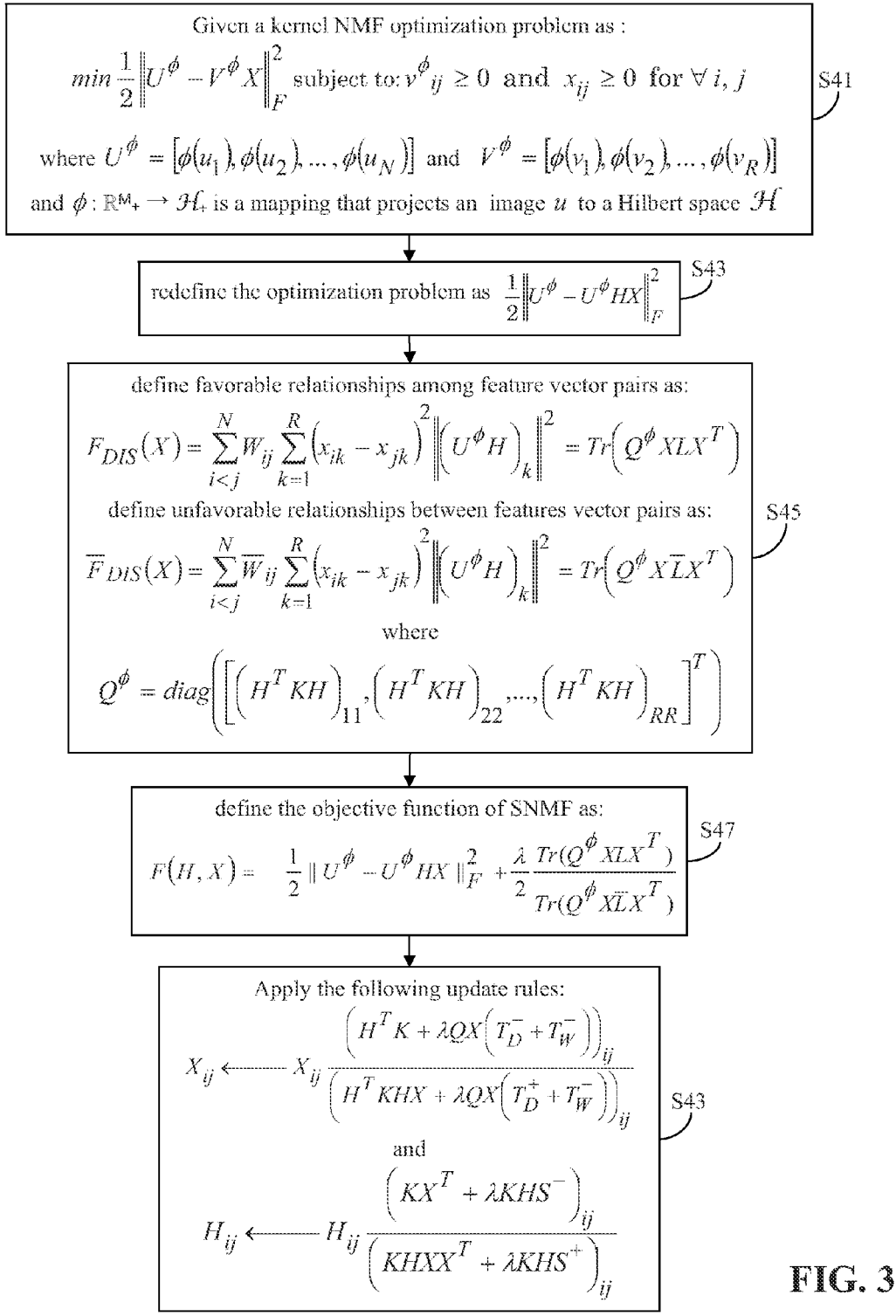
FIG. 3 is an example of the present invention incorporating a kernel NMF.

As is stated above, the distance ratio part of SNMF, which may be computed based on class labels, can be incorporated into other NMF variation. As an illustrated example in FIG. 3, the ratio part of the objective of the present invention, as defined in equation (8) is incorporated into a Kernal NMF (KNMF). The present examples uses a Kernal NMF approach as explained in article "Nonlinear Nonnegative Component Analysis", by D S. Zafeiriou and M. Petrou, in CVPR, pp. 2860-2865, 2009, which is herein incorporated in its entirety.

Beginning with step S41, let $\phi: R_+^M \rightarrow \mathcal{H}_+$ be a mapping that projects u image to a Hilbert space $\mathcal{H}$ of arbitrary dimensionality. In Kernel NMF, the decomposed matrix contains the projected images by the mapping $\phi$. More formally, Kernel NMF solves the following optimization problem:

$$\min \frac{1}{2}\|U^\phi - V^\phi X\|_F^2 \quad (20)$$

subject to:

$v_{ij}^\phi \geq 0$ and $x_{ij} \geq 0$ for $\forall i,j$ where $U^\phi=[\phi(u_1), \phi(u_2), \ldots, \phi(u_N)]$ and $V\phi=[\phi(v_1), \phi(v_2), \ldots, \phi(v_R)]$. To solve this optimization problem, KNMF assumes that every $\phi(v_j)$ can be represented as a linear combination of $\phi(u_i)$: i.e. $\phi(v_j)=\Sigma_{i=1}^N H_{ij}\phi(u_i)$.

Then the objective function in Eq. (20) can be converted (Step S43) to $$\frac{1}{2}\|U^\phi - U^\phi HX\|_F^2 \quad (21)$$

This objective can be monotonically minimized by the following updates.

$$H_{ij} \leftarrow H_{ij} \odot \frac{(KX^T)_{ij}}{(KHXX^T)_{ij}} \quad (22)$$

and $$X_{ij} \leftarrow X_{ij} \odot \frac{(H^TK)_{ij}}{(H^TKHX)_{ij}} \quad (23)$$

where $K = \lfloor K_{ij} \rfloor = \lfloor \varphi(u_i) \cdot \varphi(u_j) \rfloor$.

Using the is Kernel NMF as a feature generation method, the presently suggested approach for SNMF can now be applied. The normalized compactness of favorable relationships is (Step S45):

$$F_{DIS}(X) = \sum_{i<j}^{N} W_{ij} \sum_{k=1}^{R} (x_{ik} - x_{jk})^2 \|(U^\phi H)_k\|^2 = Tr(Q^\phi X L X^T) \quad (24)$$

and $$\overline{F}_{DIS}(X) = \sum_{i<j}^{N} \overline{W}_{ij} \sum_{k=1}^{R} (x_{ik} - x_{jk})^2 \|(U^\phi H)_k\|^2 = Tr(Q^\phi X \overline{L} X^T) \quad (25)$$

where $$Q^\phi = diag([(H^T K H)_{11}, (H^T K H)_{22}, \ldots, (H^T K H)_{RR}]^T).$$

Therefore the objective function F is defined as (step S47):

$$F(H, X) = \frac{1}{2} \|U^\phi - U^\phi H X\|_F^2 + \frac{\lambda}{2} \frac{Tr(Q^\phi X L X^T)}{Tr(Q^\phi X \overline{L} X^T)} \quad (26)$$

Following a similar logic as described above, the approximation of F is non-decreasing under the following multiplicative update rules (step S49):

$$X_{ij} \leftarrow X_{ij} \frac{(H^T K + \lambda Q X(T_D^- + T_W^-))_{ij}}{(H^T K H X + \lambda Q X(T_D^+ + T_W^+))_{ij}} \quad (27)$$

and $$H_{ij} \leftarrow H_{ij} \frac{(K X^T + \lambda K H S^-)_{ij}}{(K H X X^T + \lambda K H S^+)_{ij}} \quad (28)$$

The present SNMF approach was tested in various applications, and the results compared to other techniques known in the art.

In a first application, the present invention is first illustrated as applied to a simplified, face classification application, and its ability to generate basis images and identify specific image features is tested.

Figure 4:
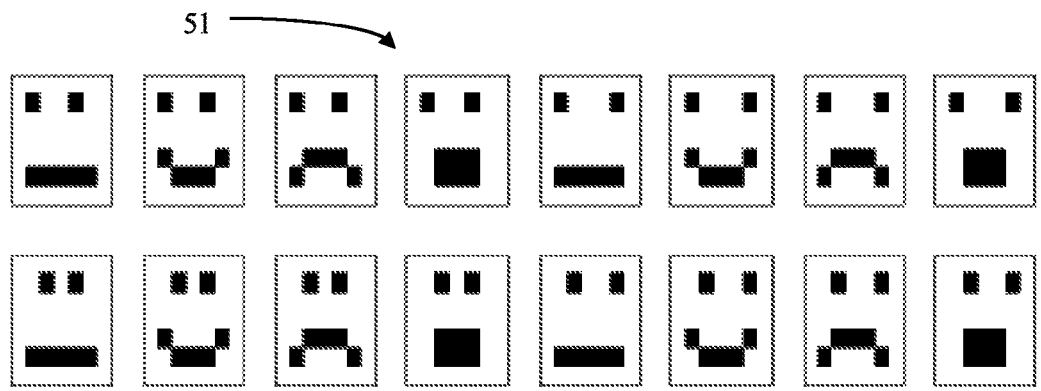
FIG. 4 shows a set of sixteen, simplified, test face images having a combination of four distinct eye-pairs and four distinct mouth for comparing the generation of basis images.

With reference to FIG. 4, a set of sixteen, 7×7 pixel, simplified, test face images 51 were first generated by combining four images of distinct eye-pairs with four images of distinct mouth shapes in all possible distinct combinations. Each eye-pair is distinguished by on pupil position.

Because of SNMF's ability to make distinctions based on labels, it is possible to specify specific features on which one wishes to focus. For example, in a first test run, the present invention is asked identify basis images (i.e. characteristic images used to classify features) to distinguish between types of eyes in the sixteen test face images. In a second test run, the present invention is asked to identify basis images to distinguish between mouth shapes. The results are shown in FIGS. 5 and 6, respectively.

Figure 5:
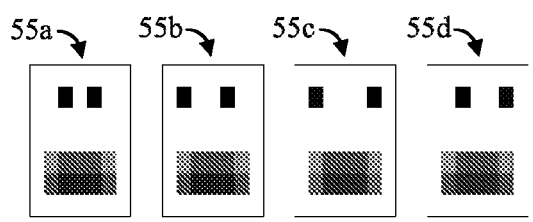
FIG. 5 illustrates the basis images generated by the present invention for identifying the distinctive eye-pairs of FIG. 4

In FIG. 5, because the present method finds the representation that effectively distinguishes different classes, when class labels are imposed placing an emphasis on eye position, the present invention correctly identifies the original four distinct eye-pairs as four basis images 55a-55d. In the present case, since the mouth area does not provide much information for classification of eye position, the mouth section of each basis image 55a-55d is averaged out.

Figure 6:
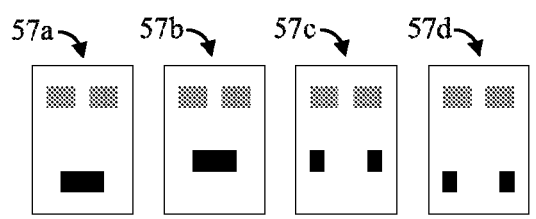
FIG. 6 illustrates the basis images generated by the present invention for identifying the distinctive mouth shapes of FIG. 4

In FIG. 6, when class labels are imposed placing an emphasis classifying mouth shape, the present invention again identifies four basis images 57a-57d for distinguishing between mouth shapes. In the present case, the eyes are averaged out since they do not provide much information for classification of mouth shape.

Figure 7:
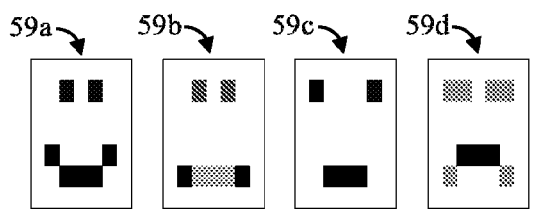
FIG. 7 illustrates four basis images generated by the prior art NMF approach for distinguishing between the 16 images of FIG. 4.

The prior art NMF approach is also applied to the sixteen test images 51 of FIG. 4, but for comparison purposes, a restriction is imposed to limited its creation of basis images to only four. The resultant four basis images are shown in FIG. 7. Since NMF does not support class labels, the resultant four images 59a-59d are insufficient for classifying the four different eye positions or the for different mouth shapes. NMF would require more basis images in order to classify even the simplified, test face images 51 of FIG. 4.

Unlike the present approach, NMF cannot utilize label information, and NMF can therefore not focus on specific parts of images, which is often an importance feature for classification purposes. Consequently, NMF needs to represent all the components sufficiently well for classification of each part. As a result, NMF requires more basis images to achieve classification of any specific feature.

The sixteen test face images 51 of FIG. 4 are very simplified representations of human faces, but real world datasets are much more complicated. In real world datasets, as the number of basis images increases, not only does the amount of information needed to discriminate between different classes increase, but also the amount of noise (i.e. image data not necessary for classification) increases, which drops the classification performance.

Because the present approach can use class data to focus on specific features, it is much more resistant to such noise, and obtains greater performance with fewer basis images. This ability is particularly important in identifying specific features, such as facial expressions.

Figure 8:
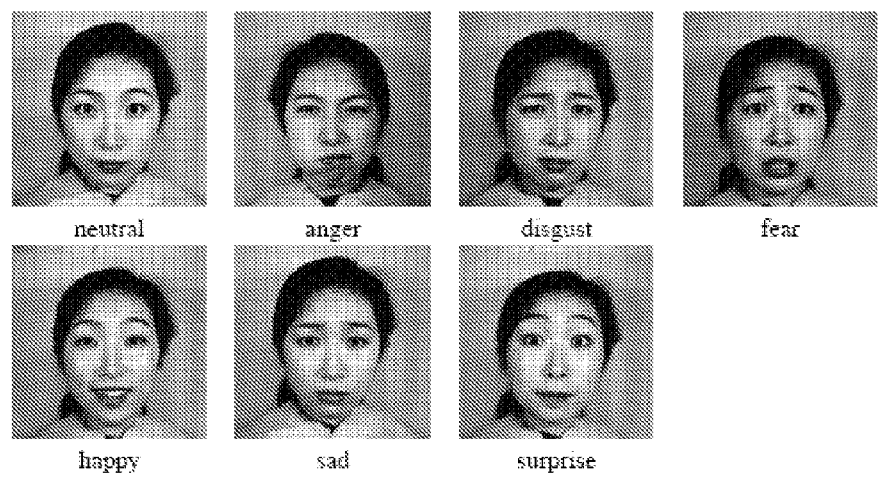
FIG. 8 is an example of 7 basic facial expressions of an image, as incorporated in the JAFFE database.
Figure 9A:
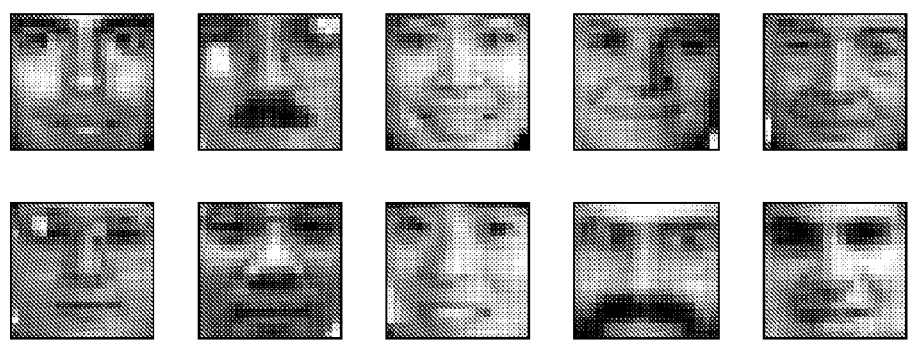
FIG. 9a is an example of face class images found in the CBCL dataset.
Figure 9B:
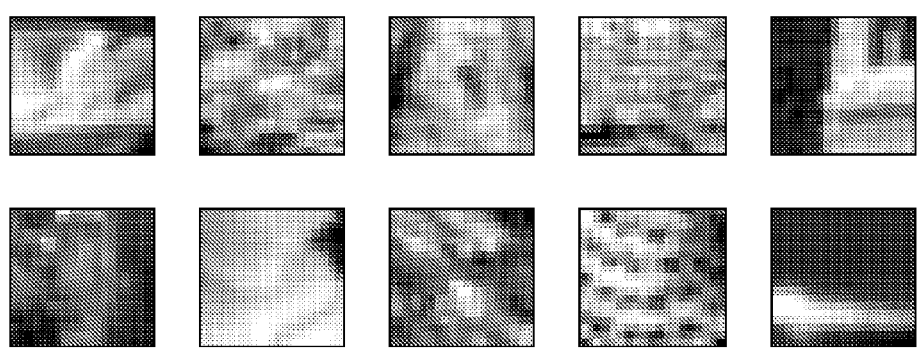
FIG. 9b is an example of non-face class images found in the CBCL dataset.

Two examples using two industry-standard databases of actual human faces are provided below. A first example uses the JAFFE database, and the second example uses the CBCL database. The JAFFE database contains 213 images of 10 Japanese female subjects. For each subject, 3 or 4 samples for each of 7 basic facial expressions are provided, as is illustrated in FIG. 8. CBCL dataset consists of two classes images (faces and non-faces), with each image having a size of 19×19 pixels. A sample of the CBCL database is illustrated in FIGS. 9a and 9b showing a sampling of the face class images and of the non-face class images, respectively.

For evaluation purposes when using the JAFFE database, once the face region is cropped, each image is down-sampled to 40×30 pixels. Following the typical approach of previous works, 150 images from the JAFFE database are randomly selected as a training set (i.e. training data), and the rest are utilized as a test set (i.e. test data). The results after ten tests is presented and compared with the accuracy results of previous works.

To test the effectiveness of the present SNMF approach, the results of the present SNMF approach is compared with eight other popular subspace learning algorithms: Nonnegative Matrix Factorization (NMF), Localized NMF (LNMF), polynomial NMF (PNMF), Principal Component Analysis (PCA), Independent Component Analysis (ICA), Linear Discriminant Analysis (LDA), kernal independent component analysis (KICA), and kernal principle component analysis (KPCA).

In the feature generation and classification setup, each column of a data matrix U is constructed by concatenating all column of an image. All elements of U are adjusted (i.e. normalized) to range from 0 to 1. U is then divided into a training set $U_{training}$ and a test set $U_{test}$. Training set $U_{training}$ is factorized into V×X. The feature matrices for the training set (i.e. $X_{training}$) and the test set (i.e. $X_{test}$) are obtained as $X_{training}=(V^TV)^{-1}V^T U_{training}$ and $X_{test}=(V^TV)^{-1}V^T U_{test}$, respectively.

For classification, a linear kernel SVM is used. The SVM parameter is determined through a validation approach. The parameter λ, which is the multiplication factor of the distance ratio part, is determined using a validation.

The above described methods of SNMF, which, as is illustrated below, is well suited for data classification, may be implemented in various types of data processing hardware.

Figure 10:
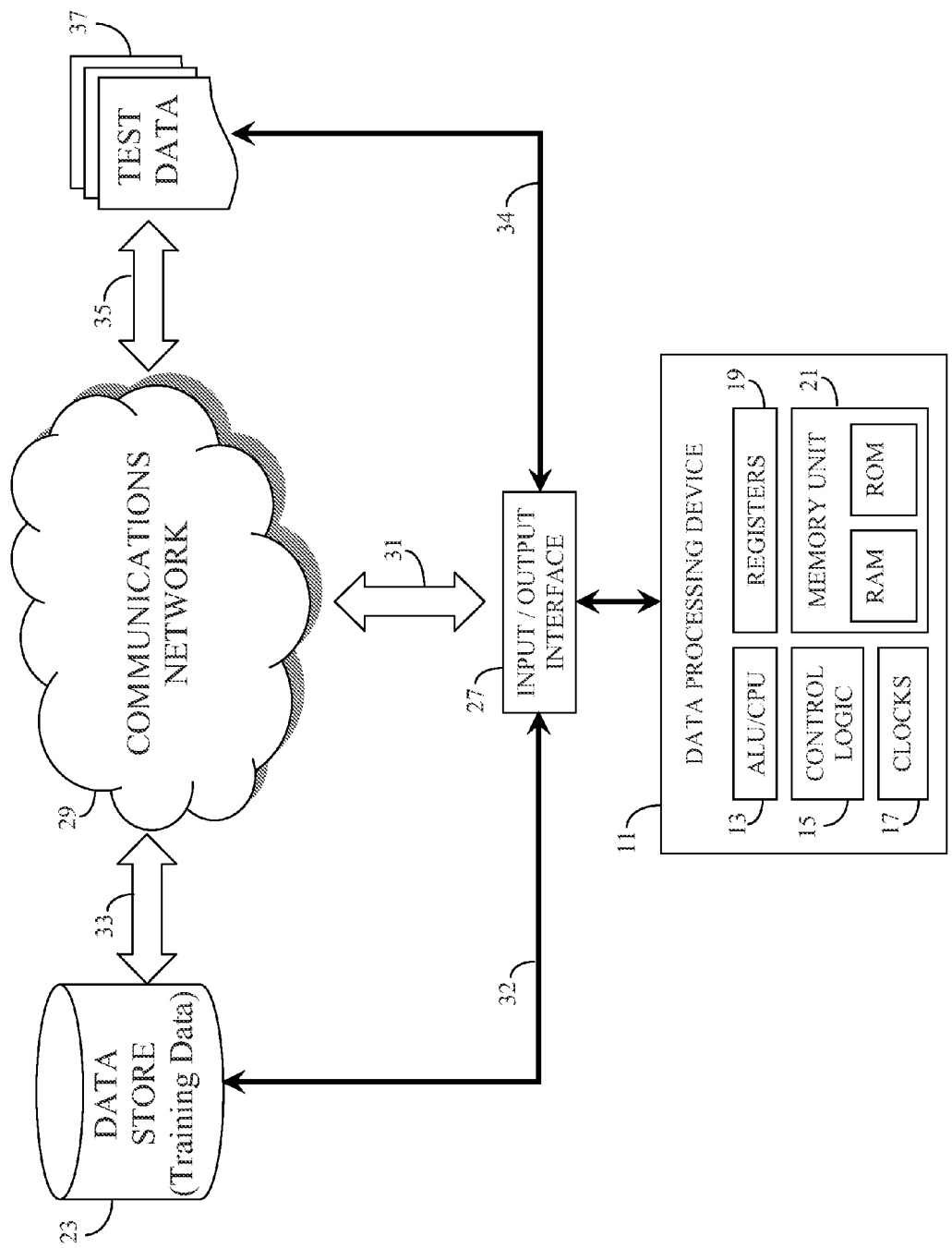
FIG. 10 shows exemplary hardware for implementing the present invention.

With reference to FIG. 10, a general example of such data processing hardware includes a data processing device 11. As it is known in the art, data processing device 11 may be a micro-computer, a central processing unit (CPU), a specialized image processor, a programmable logic device (PLD), a complex programmable logic device (CPLD), an application specific integrated circuit (ASIC), or other computing device. In general, data processing device 11 may include an arithmetic logic unit (ALU) or CPU 13, control logic 15, various timing clocks 17, various types of registers 19 (including data registers, shift registers, workspace registers, status registers, address registers, interrupt registers, instruction registers, program counters, etc.), and a memory unit 21 (including RAM and/or ROM).

In the present example of FIG. 10, raw data matrix U of n samples, which may consist of training data when used for data classification or categorization, may be maintain in a data store 23. Data processing device 11 may directly access data store 23 via a direct link 32 and appropriate input/output interface 27, or may alternatively access data store 23 via communication links 31/33 and network 29, which may be a LAN, WLAN, or the Internet.

Similarly, test data 37, which is the data that is to be classified, may be accessible via a direct link 34 or through communication network 29 and communication links 31/35. It is to be understood that test data 37 may be an archive of data (such as a store of face images) or may be generated in real time (such as face images created by surveillance cameras). It is further to be understood that communication links 31-35 may be wired or wireless communication links.

Figures 11, 12:
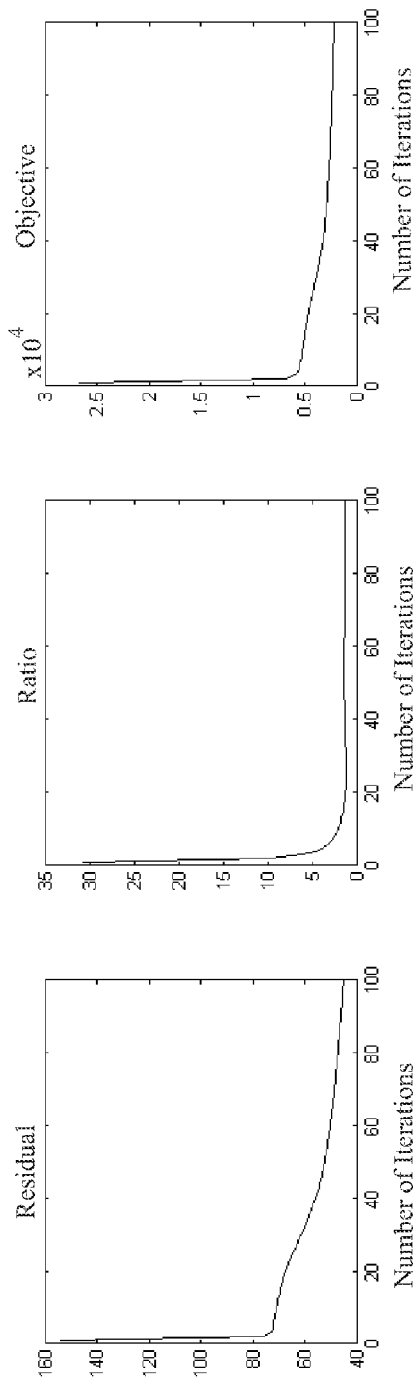
FIG. 11 shows plot results of testing of the presenting invention.
FIG. 12 is a table comparing the results of the present invention with those of eight prior art approaches.

The results of this first approach are summarized in FIGS. 11 and 12. As is illustrated in FIG. 11, the residual error and the objective function error decrease gradually with increasing iterations. Table 1 in FIG. 12 compares the performance on the JAFFE dataset of the present approach versus those of other prior art methods, in terms of the maximum accuracy and the number or required basis images. As shown, the present approach outperforms the other prior art methods. Although the LDA approach required fewer basis images, it may be noted that LDA is not robust to variations, and is particularly poor at dealing with occlusion regions (i.e. regions of an image that are obscured either by image corruption or human obstruction, such as an intentional covering of a part of the face).

Figure 13:
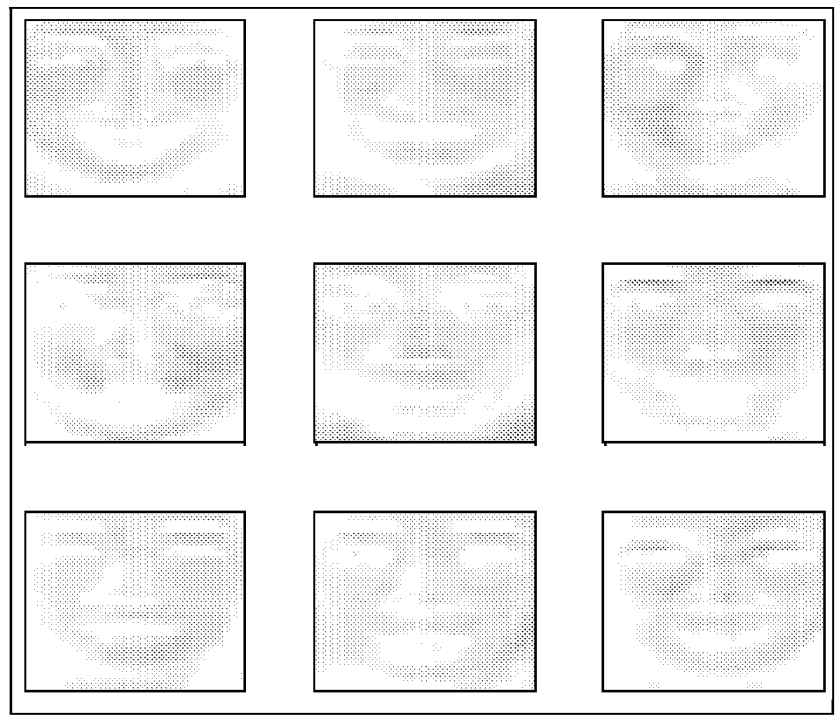
FIG. 13 shows sample basis images generated by the prior art NMF approach.

For illustration purposes, FIG. 13a provides a sampling of basis images created by NMF and FIG. 13b provides a sampling of basis image created by the present invention. As compared with the NMF basis images, the basis images of the present invention are sparser and more focused on the regions of the a human face better suited for distinguishing facial expression.

Figure 14:
FIG. 14 shows sample basis images generated by the present invention.
Figure 15:
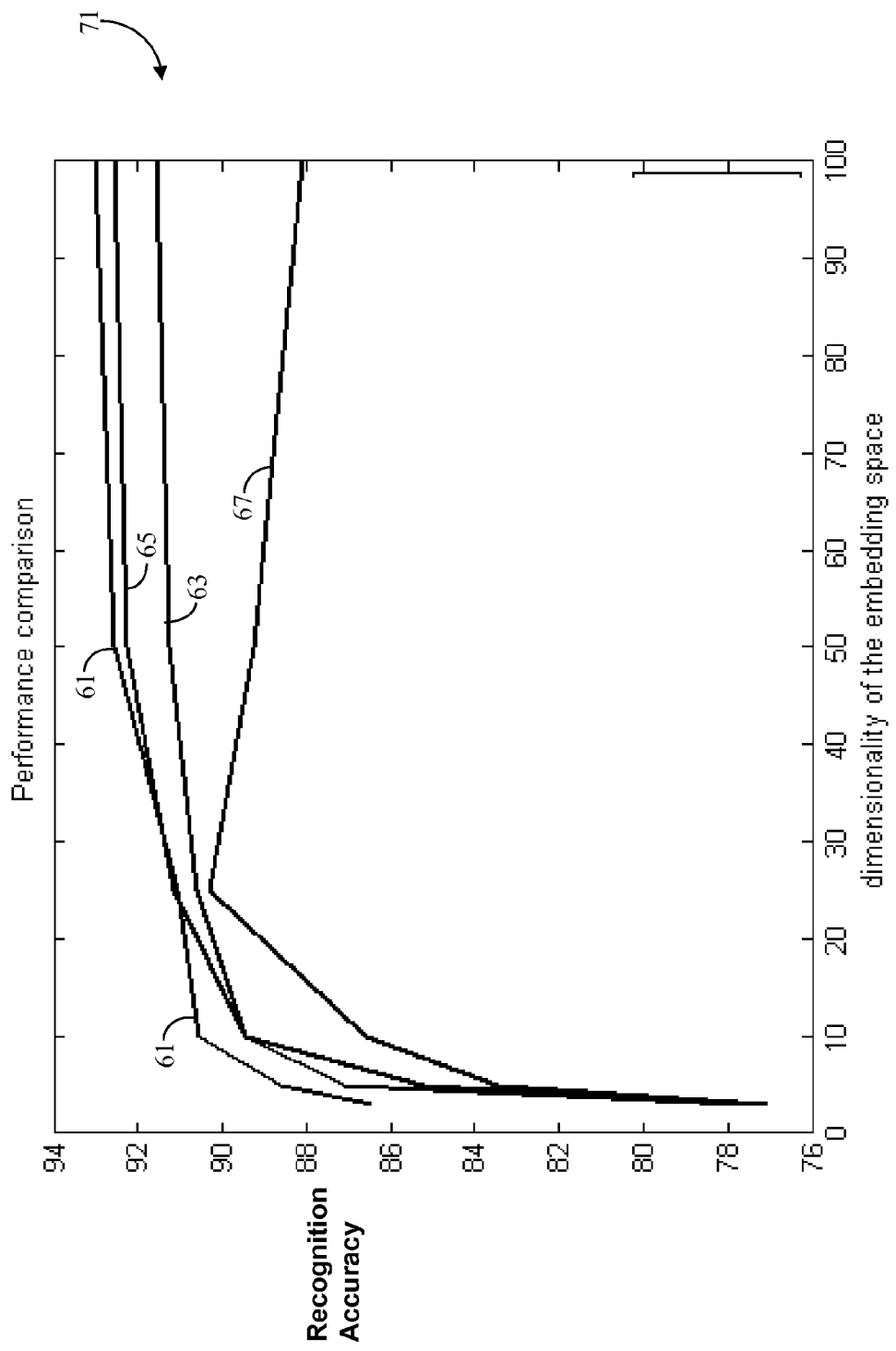
FIG. 15 is a plot comparing the accuracy of the present invention with three prior art approaches.

The results of the present invention upon the CBCL database are summarized in FIG. 14. A graph 71 plots the classification performance of the present invention 61, and compares it with the classification performance of the NMF 63, PCA 65, and ICA 67 methods. As shown, the plot present invention 61 outperforms the prior art methods.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A pattern recognition method, comprising:
providing a data processing device to implement the following steps:
accessing multiple sets of training data, each set of training data having at least one of a true example of a pattern to be recognized or a false example of a pattern to be recognized;
arranging said multiple sets of data into a data matrix U in an electronic memory constituting a data store, wherein each set of training data is arranged as a separate column in data matrix U and data matrix U is defined as $U \in \mathbb{R}^{d \times n}$, where $\mathbb{R}$ is the set of real numbers and d×n define the dimensions of data matrix U;
defining an intrinsic graph G to label specific features of most interest in the sets of training data, wherein G={U, W}, labels that identify favorable features that are features characteristic of the pattern to be recognized are added to the sets of training data in U, each column of U represents a vertex, W is a similarity matrix and each element of similarity matrix W measures the similarity between vertex pairs;
defining a penalty graph $\overline{G}$ to label specific features of least interest in the sets of training data, wherein $\overline{G}=\{U, \overline{W}\}$, labels that identify unfavorable features that are features not characterisic of the pattern to be recognized are added to the sets of training data in U, $\overline{W}$ is a dissimilarity matrix, and each element of dissimilarity matrix $\overline{W}$ measures unfavorable relationships between said vertex pairs;
defining an intrinsic diagonal matrix D, wherein $D=[D_{ij}]$ and $D_{ii}=\Sigma_{j=1}^{n}W_{ij}$;
defining an intrinsic Laplacian matrix L, wherein L=D−W;
defining a penalty diagonal matrix $\overline{D}$, wherein $\overline{D}=[\overline{D}_{ij}]$ and $\overline{D}_{ii}=\Sigma_{j=1}^{n}=\overline{W}_{ij}$;
defining a penalty Laplacian matrix $\overline{L}$, wherein $\overline{L}=\overline{D}-\overline{W}$;
defining a basis matrix V, wherein $V \in \mathbb{R}^{d \times r}$ and basis matrix V is to hold basis examples of the sets of training data, the basis examples being a reduction of the sets of training data into simplified representations that highlight distinguishing characteristics of the pattern to be recognized;
defining a feature matrix X, wherein $X \in \mathbb{R}^{r \times n}$ feature matrix X is to hold features values to construct an approximation of U from basis matrix V;
incorporating the label information of intrinsic graph G and penalty graph $\overline{G}$ into the construction of basis matrix V and features matrix X by defining a measure of the compactness of intrinsic graph G by the weighted sum of squared distances defined as $\Sigma_{i<j}^{n}W_{ij}\|x_i-x_j\|^2=\text{Tr}(XLX^T)$, wherein $x_i$ is the i-th column of X and $x_j$ is the j-th column of X;
defining a measure of the separability of penalty graph $\overline{G}$ by the weighted sum of squared distances defined as $\Sigma_{i<j}{}^n \overline{W}_{ij}\|x_i-x_j\|^2 = Tr(X\overline{L}X^T)$ wherein $x_i$ is the i-th column of X and $x_j$ is the j-th column of X;

defining $F^{(1)}(V,X)$ as an objective of NMF (nonnegative matrix factorization), $F^{(1)}(V,X)$ being proportional to $F^{(1)}(V,X)=\frac{1}{2}\|U-VX\|_F^2$;

defining $F^{(2)}(X)$ as an objective of graph embedding, $F^{(2)}(X)$ being proportional to ratio $$\frac{Tr(XLX^T)}{Tr(X\overline{L}X^T)};$$

deriving an SNMF (supervised nonnegative matrix factorization) objective from a sum of $F^{(1)}(V,X)$ and $F^{(2)}(X)$;

populating basis matrix V and feature matrix X by solving the derived SNMF objective through iterative multiplicative updates; and separating recognizable patterns within the basis examples of basis matrix V into distinct pattern classifications using a data classifier, these pattern classifications of the basis examples being deemed the recognized patterns of the sets of training data;

wherein:

said pattern recognition method is a face detection method;

each of said set of training data is a distinct training image;

the favorable features labeled in intrinsic graph G identify regions within each distinct training image that are to be focused upon when defining the basis examples;

the unfavorable features labeled in intrinsic graph G identify regions within each distinct training image that are of least interest when defining the basis examples;

at least one of said distinct pattern classifications is a face pattern classification; and a received test image is tested for the existence of a face by determining a basis test sample from the received test image, submitting the basis test sample to the data classifier, and if the data classifier identifies the basis test sample as belonging to the face pattern classification, then deeming the received test image as having a rendition of a face.

2. The method of claim 1, wherein:

$F^{(1)}(V,X)$ is defined as $F^{(1)}(V,X)=\frac{1}{2}\|U-VX\|_F^2$;

$F^{(2)}(X)$ is defined as $$F^{(2)}(X) = \frac{\lambda}{2}\frac{Tr(XLX^T)}{Tr(X\overline{L}X^T)},$$

where $\lambda$ is a multiplication factor determined by a validation technique.

3. The method of claim 1, wherein $F^{(1)}(V,X)$ is defined as $F^{(1)}(V,X)=\frac{1}{2}\|U-VX\|_F^2$;

$F^{(2)}(X)$ is defined as $$F^{(2)}(X) = \frac{\lambda}{2}\frac{Tr(QXLX^T)}{Tr(QX\overline{L}X^T)},$$

where $\lambda$ is a multiplication factor determined by a validation technique, and where $$Q = \text{diag}([\|v_1\|^2, \|v_2\|^2, \ldots, \|v_R\|^2]^T);$$

and said SNMF objective is defined as $$\min_{V,X} F(V,X) = \frac{1}{2}\|U-VX\|_F^2 + \frac{\lambda}{2}\frac{Tr(QXLX^T)}{Tr(QX\overline{L}X^T)}.$$

4. The method of claim 3, further comprising:

approximating the objective of SNMF as $$\tilde{F}(V,X) = \frac{1}{2}\|U-VX\|_F^2 + \frac{\lambda}{2}\left(\alpha Tr(QXLX^T) - \beta Tr(QX\overline{L}X^T) + \frac{\beta}{\alpha}\right),$$

where $V=V^t$ and $X=X^t$ at time t and $$\alpha = \frac{1}{Tr(Q^t X^t \overline{L} X^{t^T})} \text{ and } \beta = \frac{Tr(Q^t X^t L X^{t^T})}{(Tr(Q^t X^t \overline{L} X^{t^T}))^2}.$$

5. The method of claim 4, wherein:

said SNMF objective is determined through the following iterative multiplicative updates:

$$X_{ij} \leftarrow X_{ij}\frac{(V^T U + \lambda QX(T_D^- + T_W^-))_{ij}}{(V^T VX + \lambda QX(T_D^+ + T_W^+))_{ij}}$$

where $T_D=\alpha D-\beta\overline{D}$ and $T_W=\alpha W-\beta\overline{W}$, and $$V_{ij} \leftarrow V_{ij}\frac{(UX^T + \lambda VS^-)_{ij}}{(VXX^T + \lambda VS^+)_{ij}}$$

where $S=\alpha L-\beta\overline{L}$.

6. The method of claim 1, wherein the data classifier is a support vector machine (SVM).

7. The method of claim 1, wherein W and $\overline{W}$ are generated from true relationships among data pairs.

8. The method of claim 7, wherein said data pairs are class label data.

9. The method of claim 1, wherein each column of feature matrix X is a low dimensional representation of the corresponding column of U.

10. The method of claim 1, wherein at least one of similarity matrix W or dissimilarity matrix $\overline{W}$ has negative values.

11. The method claim 10, wherein $Tr(XLX^T)$ and $Tr(X\overline{L}X^T)$ are positive.

12. The method of claim 1, wherein similarity matrix W and dissimilarity matrix $\overline{W}$ are defined by the concept of within-class and between-class distances of Linear Discriminant Analysis (LDA).

13. The method of claim 12, wherein:
similarity matrix $W=[W_{ij}]$ is defined as:

$$W_{ij} = \begin{cases} \frac{1}{n_c} & \text{if } y_i, y_j \in c \\ 0 & \text{otherwise} \end{cases}$$

wherein $y_i$ is a class label of the i-th sample, $y_j$ is a class label of the j-th sample, and $n_c$ is the size of class c; and
dissimilarity matrix $\overline{W}=[\overline{W}_{ij}]$ is defined as $$\overline{W}_{ij} = \frac{1}{n} - W_{ij}$$

wherein n is the number of data points.

14. A pattern recognition system for processing input test data, comprising:
an electronic memory storing multiple sets of training data, each set of training data having at least one of a true example of a pattern to be recognized or a false example of a pattern to be recognized, wherein said electronic memory constitutes a data store, said multiple sets of training data are arranged into a data matrix U, each set of training data is arranged as a separate column in data matrix U, and data matrix U is defined as $U \in \mathbb{R}^{d \times n}$ where $\mathbb{R}$ is the set of real numbers and d×n define the dimensions of data matrix U;
a data processing device having access to said electronic memory and being configured to implement the following steps:
defining an intrinsic graph G to label specific features of most interest in the sets of training data, wherein G={U, W}, labels that identify favorable features that are features characterisic of the pattern to be recognized are added to the sets of training data in U, each column of U representing a vertex, W is a similarity matrix and each element of similarity matrix W measures the similarity between vertex pairs;
defining a penalty graph $\overline{G}$ to label specific features of least interest in the sets of training data, wherein $\overline{G}=\{U,\overline{W}\}$, labels that identify unfavorable features that are features not characterisic of the pattern to be recognized are added to the sets of training data in U, $\overline{W}$ is a dissimilarity matrix, and each element of dissimilarity matrix $\overline{W}$ measures unfavorable relationships between said vertex pairs;
defining an intrinsic diagonal matrix D as $D=[D_{ij}]$ and $D_{ii}=\Sigma_{j=1}^n W_{ij}$;
defining an intrinsic Laplacian matrix L as L=D−W;
defining a penalty diagonal matrix $\overline{D}$ as $\overline{D}=[\overline{D}_{ij}]$ and $\overline{D}_{ii}=\Sigma_{j=1}^n \overline{W}_{ij}$;
defining a penalty Laplacian matrix $\overline{L}$ as $\overline{L}=\overline{D}-\overline{W}$;
defining a basis matrix V as $V \in \mathbb{R}^{d \times r}$, wherein basis matrix V is to hold basis examples of the sets of training data, the basis examples being a reduction of the sets of training data into simplified representations that highlight distinguishing characteristics of the pattern to be recognized;
defining a feature matrix X as $X \in \mathbb{R}^{r \times n}$, wherein feature matrix X is to hold features values to construct an approximation of U from basis matrix V;
incorporating the label information of intrinsic graph G and penalty graph $\overline{G}$ into the construction of basis matrix V and features matrix X by defining a measure of the compactness of intrinsic graph G by the weighted sum of squared distances defined as $\Sigma_{i<j}^n W_{ij}\|x_i-x_j\|^2 = Tr(XLX^T)$, wherein $x_i$ is the i-th column of X and $x_j$ is the j-th column of X;
defining a measure of the separability of penalty graph $\overline{G}$ by the weighted sum of squared distances defined as $\Sigma_{i<j}^n \overline{W}_{ij}\|x_i-x_j\|^2 = Tr(X\overline{L}X^T)$, wherein $x_i$ is the i-th column of X and $x_j$ is the j-th column of X;
defining $F^{(1)}(V,X)$ as an objective of NMF (nonnegative matrix factorization), wherein as $F^{(1)}(V,X)=\frac{1}{2}\|U-VX\|_F^2$;
defining $F^{(2)}(X)$ as an objective of graph embedding, where $$F^{(2)}(X) = \frac{\lambda}{2}\frac{Tr(QXLX^T)}{Tr(QX\overline{L}X^T)},$$

$\lambda$ is a multiplication factor determined by a validation technique, and $$Q = \text{diag}([\|v_1\|^2, \|v_2\|^2, \ldots, \|v_R\|^2]^T);$$

defining an approximation of supervised nonnegative factorization, SNMF, as $$\tilde{F}(V, X) = \frac{1}{2}\|U - VX\|_F^2 + \frac{\lambda}{2}\left(\alpha Tr(QXLX^T) - \beta Tr(QX\overline{L}X^T) + \frac{\beta}{\alpha}\right),$$

where $V=V^t$ and $X=X^t$ at time t, $$\alpha = \frac{1}{Tr(Q^t X^t \overline{L} X^{tT})}, \text{ and } \beta = \frac{Tr(Q^t X^t L X^{tT})}{(Tr(Q^t X^t \overline{L} X^{tT}))^2};$$

identifying factorized matrices $X_{ij}$ and $V_{ij}$ by the following iterative multiplicative updates:

$$X_{ij} \leftarrow X_{ij} \frac{(V^T U + \lambda QX(T_D^- + T_W^-))_{ij}}{(V^T VX + \lambda QX(T_D^+ + T_W^+))_{ij}}$$

where $T_D = \alpha D - \beta \overline{D}$ and $T_W = \alpha W - \beta \overline{W}$, and $$V_{ij} \leftarrow V_{ij} \frac{(UX^T + \lambda VS^-)_{ij}}{(VXX^T + \lambda VS^+)_{ij}}$$

where $s = \alpha L - \beta \overline{L}$; and
classifying the test data according to classifications defined by $X_{ij}$ using a data classifier;
wherein:
the pattern recognition system is a face recognition system and the classifications defined by $X_{ij}$ include a face classification;
each of said set of training data is a distinct training image;
the favorable features labeled in intrinsic graph G identify regions within each distinct training image that are to be focused upon when defining the basis examples;
the unfavorable features labeled in intrinsic graph G identify regions within each distinct training image that are of least interest when defining the basis examples; and a received test image is tested for the existence of a face by determining a basis test sample from the received test image, submitting the basis test sample to the using a data classifier, and if the using a data classifier identifies the basis test sample as belonging to the face classification, then deeming the received test image as having a rendition of a face.

15. The system of claim 14, wherein said data pairs are class labels of data.

16. The system of claim 14, wherein at least one of similarity matrix W or dissimilarity matrix $\overline{W}$ has negative values.

17. The system of claim 14, wherein:
similarity matrix W=[$W_{ij}$] is defined as:

$$W_{ij} = \begin{cases} \frac{1}{n_c} & \text{if } y_i, y_j \in c \\ 0 & \text{otherwise} \end{cases}$$

wherein $y_i$ is a class label of the i-th sample and $n_c$ is the size of class c; and
dissimilarity matrix $\overline{W}$=[$\overline{W}_{ij}$] is defined as $$\overline{W}_{ij} = \frac{1}{n} - W_{ij}$$

wherein n is the total number of data points.

18. A pattern recognition method, comprising:
providing a data processing device to implement the following steps:
accessing multiple sets of training data, each set of training data having at least one of a true example of a pattern to be recognized or a false example of a pattern to be recognized;
arranging said multiple sets of data into a data matrix U in an electronic memory constituting a data store, wherein each set of training data is arranged as a separate column in data matrix U and data matrix U is defined as U∈$\mathbb{R}^{d \times n}$, where $\mathbb{R}$ is the set of real numbers and d×n define the dimensions of data matrix U;
defining an intrinsic graph G to label specific features of most interest in the sets of training data, wherein G={U, W}, labels that identify favorable features that are features characterisic of the pattern to be recognized are added to the sets of training data in U, each column of U represents a vertex, W is a similarity matrix and each element of similarity matrix W measures the similarity between vertex pairs;
defining a penalty graph $\overline{G}$ to label specific features of least interest in the sets of training data, wherein $\overline{G}$={U,W}, to label specific features of least interest in the sets of training data, $\overline{W}$ is a dissimilarity matrix, and each element of dissimilarity matrix $\overline{W}$ measures unfavorable relationships between said vertex pairs;
defining an intrinsic diagonal matrix D, wherein D=[$D_{ij}$] and $D_{ii} = \sum_{j=1}^{n} W_{ij}$;
defining an intrinsic Laplacian matrix L, wherein L=D−W;
defining a penalty diagonal matrix $\overline{D}$, wherein $\overline{D}$=[$\overline{D}_{ij}$] and $\overline{D}_{ii} = \sum_{j=1}^{n} \overline{W}_{ij}$;
defining a penalty Laplacian matrix $\overline{L}$, wherein $\overline{L} = \overline{D} - \overline{W}$;
defining a basis matrix V, wherein V∈$\mathbb{R}^{d \times r}$ and basis matrix V is to hold basis examples of the sets of training data, the basis examples being a reduction of the sets of training data into simplified representations that highlight distinguishing characteristics of the pattern to be recognized;
incorporating the label information of intrinsic graph G and penalty graph $\overline{G}$ into the construction of basis matrix V and features matrix X by defining a feature matrix X, where X∈$\mathbb{R}^{r \times n}$, wherein feature matrix X is to hold features values to construct an approximation of U from basis matrix V;
given a kernel NMF optimization problem of min½$\|U^\Phi - V^\Phi X\|_F^2$ wherein $v^\Phi_{ij} \geq 0$ and $x_{ij} \geq 0$ for ∀i, j, $U^\Phi = [\phi(u_1), \phi(u_2), \ldots, \phi(u_N)]$, $V^\Phi = [\phi(v_1), (v_2), \ldots, \phi(v_R)]$, and $\phi: \mathbb{R}^M_+ \to H_+$ is a mapping that projects an image u to a Hilbert space H, representing $\phi(v_j)$ as a linear combination of $\phi(u_i)$, where $\phi(v_j) = \sum_{i=1}^{N} H_{ij} \phi(u_i)$, and redefining said kernel NMF optimization as ½$\|U^\Phi - U^\Phi HX\|_F^2$;
defining favorable relationships among feature vector pairs as:

$$F_{DIS}(X) = \sum_{i<j}^{N} W_{ij} \sum_{k=1}^{R} (x_{ik} - x_{jk})^2 \|(U^\phi H)_k\|^2 = Tr(Q^\phi XLX^T),$$

where $$Q^\phi = \text{diag}\big([(H^T KH)_{11}, (H^T KH)_{22}, \ldots, (H^T KH)_{RR}]^T\big),$$

where $$K = \lfloor K_{ij} \rfloor = \lfloor \varphi(u_i) \cdot \varphi(u_j) \rfloor;$$

defining unfavorable relationships between features vector pairs as:

$$\overline{F}_{DIS}(X) = \sum_{i<j}^{N} \overline{W}_{ij} \sum_{k=1}^{R} (x_{ik} - x_{jk})^2 \|(U^\phi H)_k\|^2 = Tr(Q^\phi X\overline{L}X^T);$$

defining an SNMF (supervised nonnegative matrix factorization) objective function as $$F(H, X) = \frac{1}{2} \|U^\phi - U^\phi HX\|_F^2 + \frac{\lambda}{2} \frac{Tr(Q^\phi XLX^T)}{Tr(Q^\phi X\overline{L}X^T)} ; \text{and}$$

populating basis matrix V and feature matrix X by applying the following iteratively multiplicative updates to achieve said SNMF objective function:

$$X_{ij} \leftarrow X_{ij} \frac{(H^T K + \lambda QX(T_D^- + T_{\overline{W}}^-))_{ij}}{(H^T KHX + \lambda QX(T_D^+ + T_{\overline{W}}^+))_{ij}}$$

and $$H_{ij} \leftarrow H_{ij} \frac{(KX^T + \lambda KHS^-)_{ij}}{(KHXX^T + \lambda KHS^+)_{ij}};$$

separating recognizable patterns within the basis examples of basis matrix V into distinct pattern classifications using a data classifier, these pattern classifications of the basis examples being deemed the recognized patterns of the sets of training data;

wherein:

said pattern recognition method is a face detection method;

each of said set of training data is a distinct training image;

the favorable features labeled in intrinsic graph G identify regions within each distinct training image that are to be focused upon when defining the basis examples;

the unfavorable features labeled in intrinsic graph G identify regions within each distinct training image that are of least interest when defining the basis examples;

at least one of said distinct pattern classifications is a face pattern classification; and a received test image is tested for the existence of a face by determining a basis test sample from the received test image, submitting the basis test sample to the data classifier, and if the data classifier identifies the basis test sample as belonging to the face pattern classification, then deeming the received test image as having a rendition of a face.

\* \* \* \* \*